United States Patent Office 3,741,849
Patented June 26, 1973

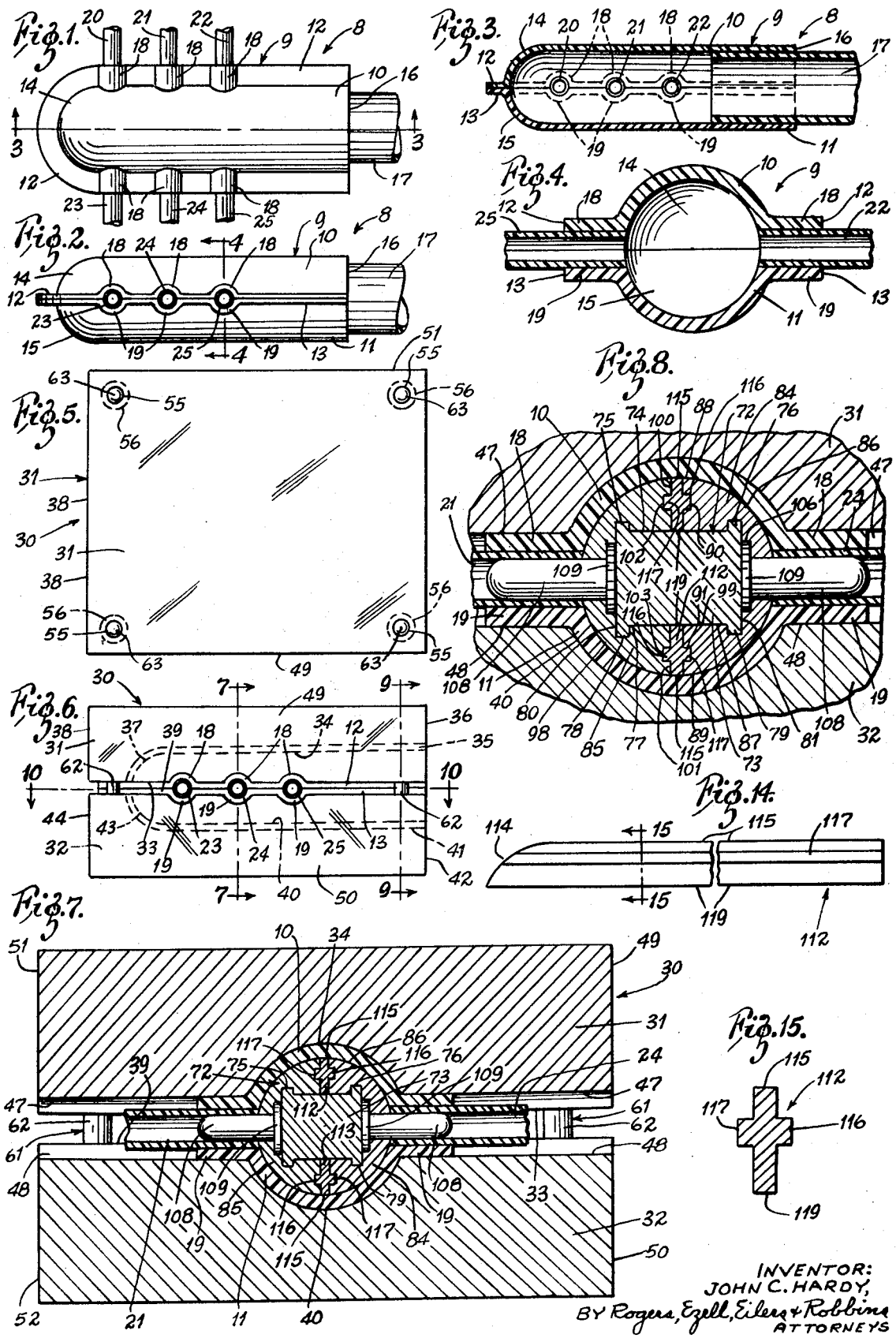

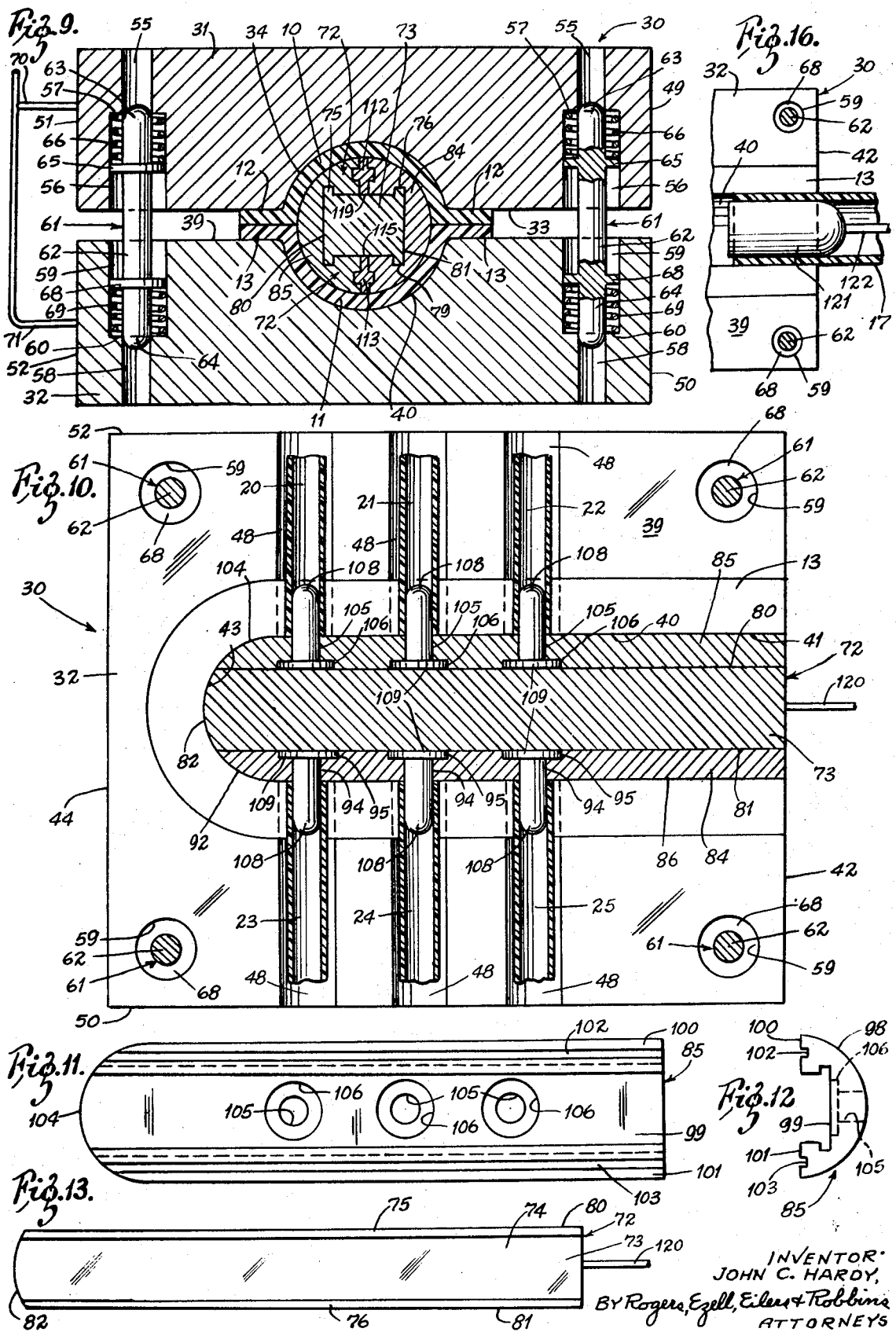

3,741,849
METHOD OF JOINING TUBES TO MANIFOLD
John C. Hardy, Weatogue, Conn., assignor to Angelica Corporation, St. Louis, Mo.
Filed Feb. 8, 1971, Ser. No. 113,274
Int. Cl. B29b 1/14
U.S. Cl. 156—500                     3 Claims

ABSTRACT OF THE DISCLOSURE

Apparatus and method for joining plastic tubes to a plastic manifold utilizing heat and pressure and an interlocking multi-part core.

BRIEF DESCRIPTION OF THE INVENTION

In this invention, a fast and economical way is provided for joining tubes to a manifold. In the method, two blocks are biased apart but are movable toward one another under pressure. The blocks are shaped to receive two plastic sheets between them for forming a manifold. An interlocking core assembly can be assembled and placed between the two plastic sheets to shape the manifold and to hold tubes in place for sealing to the manifold. When the blocks are brought together under pressure and heat is applied through the creation of an electric field, the manifold is formed and is sealed to the ends of the tubes.

BRIEF DESCRIPTION OF THE DRAWINGS

FIG. 1 is a top plan view of a typical manifold and tube assembly made by the process of this invention;

FIG. 2 is a side elevation view of the manifold and tube assembly of FIG. 1;

FIG. 3 is a longitudinal section along the line 3—3 of FIG. 1;

FIG. 4 is an enlarged transverse section along the line 4—4 of FIG. 2;

FIG. 5 is a top plan view of the forming plate assembly employed to produce the manifold of FIGS. 1–4;

FIG. 6 is a front side elevation of FIG. 5;

FIG. 7 is an enlarged vertical section along the line 7—7 of FIG. 6;

FIG. 8 is a further enlarged reproduction of the central portion of FIG. 7;

FIG. 9 is an enlarged vertical section along the line 9—9 of FIG. 6;

FIG. 10 is an enlarged view, partly in section, along the line 10—10 of FIG. 6;

FIG. 11 is an inner face view of one of a pair of locking inserts;

FIG. 12 is a right end view of the FIG. 11 insert;

FIG. 13 is a plan view of the locking block;

FIG. 14 is a side elevation of one of a pair of separator inserts;

FIG. 15 is an enlarged section along the line 15—15 of FIG. 14; and

FIG. 16 is a reduced fragmentary view similar to FIG. 10, with the inserts removed, and the open end of the larger tube and its inserted core in place.

DETAILED DESCRIPTION OF THE INVENTION

FIGS. 1 and 2 illustrate a manifold and tube assembly 8 that is typical of those that can be made by the process of this invention. This typical manifold and tube assembly 8 comprises a manifold 9 having upper and lower semi-cylindrical walls 10 and 11 joined together by heat sealing of laterally extending flange walls 12 and 13. At one end, the upper and lower walls 10 and 11 have rounded ends 14 and 15 to provide a closed end, whereas the other end 16 is open and receives a large tube 17 that is heat sealed to the inner surfaces of the walls 12 and 13 adjacent the open end 16. The enlarged tube 17 therefore communicates with the interior of the manifold 9.

The upper and lower flange walls 12 and 13 have curved sections 18 and 19 that are heat sealed about smaller diameter plastic tubes 20, 21, 22, 23, 24, and 25. These smaller diameter tubes 20–25 extend inwardly a distance about equal to the width of the flange walls 12 and 13, and they also communicate with the interior of the manifold 9. Thus, the manifold 9 provides fluid-tight communication between the larger tube 17 and the smaller tubes 20–25. It should be noted that more than one large tube 17 may be provided if necessary or desired, and any number of smaller tubes 20–25 may be provided. The manifold 9 with the single large tube 17 and six smaller tubes 20–25 ilustrates a typical manifold and tube assembly made by the process of this invention.

The aparatus 30 for making this manifold and tube assembly comprises upper and lower plates 31 and 32, respectively, that are mounted in a conventional machine (not shown) which holds the lower plate 32 in a fixed position and can move the upper plate 31 downwradly under hydraulic force. The upper plate 31 has a lower face 33 and a central cavity 34 that is in the shape of slightly less than half of a cylinder with one end 35 opening to an end 36 of the plate 31 and the other end 37 rounded in a termination short of the other end 38 of the plate 31.

The lower plate 32 has an upper face 39 with a complementary cavity 40 that forms almost half a cylinder with one end 41 opening to one end 42 of the plate 32 and the other end 43 being rounded and terminating short of the end 44 of the plate 32.

Depending on the number of tubes that are to be joined to a manifold, there is a corresponding number of complementary, almost semi-cylindrical, recesses 47 and 48 in the faces 33 and 39 of the plates 31 and 32. The recesses 47 and 48 project laterally from the cavities 34 and 40 to the front sides 49 and 50, respectively, and the rear sides 51 and 52, respectively, of the upper and lower plates 31 and 32.

The upper plate 31 has four bores 55 near its corners. Countersunk bores 56 join the bores 55 at annular shoulders 57. Aligned therewith, the lower plate 32 has four bores 58 and four countersunk bores 59 with annular shoulders 60 therebetween. The bores 56 and 59 open to the faces 33 and 39 of the plates 31 and 32. A composite pin 61 is mounted in each pair of aligned bores and countersunk bores. Each composite pin has a central shaft 62, the upper end 63 of which slides within the bore 55 and the lower end 64 of which slides within the bore 58. A ring 65 is integral with the shaft 62 and spaced below its upper end 63. A compression spring 66 is mounted between the ring 65 and the shoulder 57. A similar ring 68 is integral with the shaft 62 and a compression spring 69 is mounted between the ring 68 and the shoulder 60. The compression springs 66 and 69 cooperate with the composite pins 61 to bias the plate 31 upwardly from the position shown in FIG. 9. Electrode leads 70 and 71 (see FIG. 9) are connected to the plates 31 and 32 and are joined together for connection to one terminal of a source of electrical potential (not shown).

A core assembly 72 includes an elongated locking block 73 that has an upper face 74 between two upwardly projecting square cornered ribs 75 and 76 and a lower face 77 between two downwardly projecting square cornered ribs 78 and 79. The locking block has two flat side faces 80 and 81 and a rounded left end 82. The core assembly also has a forward locking insert 84 and a rearward locking insert 85. The forward locking insert has a semi-cylindrical wall 86 and a central cavity 87 shaped complementary to the front half of the locking block 73. The rear faces 88 and 89 of the front insert block 84 have upper and lower square cornered longitudinal recesses 90 and 91. The left end 92 of the front insert block 84 is rounded. The outer surface including the semi-cylindrical surface 86 and the left end 92 is spaced from the inner cavity wall 34 including the grooved end 37 of the plate 31 by a uniform distance equal to the desired thickness of the wall of the manifold 9. The forward insert block 84 has three bores 94 with shallow countersunk bores 95 concentric and aligned with the common axes of the respective recesses 47 and 48 when the front insert block is in the position illustrated in FIGS. 7 and 10.

Correspondingly, the rear insert block 85 has an outer cylindrical wall 98 and an inner recess 99 complementary to the shape of the rear half of the insert block 73. The upper and lower forward faces 100 and 101 have longitudinal square cornered grooves 102 and 103 in them. The left end 104 is rounded. Rearwardly extending bores 105 and shallow countersunk bores 106 are coaxial with the composite axes of the rearwardly extending recesses 47 and 48.

A pin 108 is mounted within each bore 94 and within each bore 105. Each pin 108 has an enlarged annular flange 109 that is received in each countersunk bore 95 and each countersunk bore 106 and that bears against the adjacent front or rear face 80 or 81 of the locking block 73. Finally, the core assembly 72 includes upper and lower separator inserts 112 and 113 each of which, as shown in FIG. 14, has a rounded left end 114 and an edge 115 that continues the cylindrical shapes of the insert block walls 86 and 98. Each separator insert also has square cornered flanges 116 and 117 received within the square cornered grooves 90 and 102 and 91 and 103, and edges 119 that engage the faces 74 and 77 of the block 73. An electrode lead 120 is connected to the locking block 73 and to an electrode of a source of electrical potential. The electrode lead 120 carries a potential of opposite polarity to that carried by the electrode leads 70 and 71.

As shown in FIG. 16, there is a separate cylindrical core 121 of a diameter to fit within the large tube 17. An electrode lead 122 is connected to the core 121, and to the same terminal of the electric potential source as the lead 120.

To make a manifold and tube assembly 8 of the kind illustrated in FIGS. 1 and 2, the upper plate 31 is released from the downward pressure of the machine that is not illustrated so that the compression springs 66 and 69 can raise it well above the position illustrated in FIG. 7. A flat piece of plastic that is to form the lower semi-cylindrical wall 13 of the manifold is laid over the lower cavity 40. Next, the core assembly 72 is laid in place, if it has been assembled and if not, it is assembled and then laid in place. Assembly of the core assembly 72 is done by pushing three pins 108 into the bores 94 of the front insert block 84 and three pins 108 into the bores 105 of the rear insert block 85. Then the locking block 73 is slipped into place within the front and rear insert blocks 84 and 85 to trap the pins 108 and lock them radially outward with their flanges 109 seated within the countersunk bores 95 and 106 and to lock the two insert blocks 84 and 85 in their basic relative positions. Finally, the separator inserts 112 and 113 are slid into place to make the overall assembly rigid.

Next, the individual tubes 20, 21, 22, 23, 24 and 25 are mounted on the pins 108 with the inner ends abutting the adjacent front or rear insert block 84 or 85 and this assembly is laid on the plastic sheet.

After an upper plastic sheet is laid over the core assembly directly beneath the upper cavity 34, the upper plate 31 is driven downwardly as an electric potential of one polarity is applied to the two plates 31 and 32 and an electric potential of opposite polarity is applied to the core assembly 72 to create a heat generating electric field. Under this heat and pressure, the flanges 12 and 13 are sealed together where they are in contact and are sealed to the small tubes 20, 21, 22, 23, 24 and 25 where they are in contact. Thereafter, the pressure applied to the upper plate 31 is released so that the compression springs 66 and 69 can raise the upper plate 31. The core assembly 72 can be disassembled from within the manifold 9 by first removing the separator inserts 112 and 113, then the locking block 73, then (following retraction of the three pins 108) one of the insert blocks 84 or 85, followed by removal of the other insert block. Now the core 121 is inserted in the open end of a larger tube 17 and the larger tube 17 with the core 121 is inserted within the open end of the interior of the just-formed manifold 9. Again, the upper plate 31 is driven downwardly under pressure as the electric field is established now between the two plates 31 and 32 and the cylindrical core 121. Under this applied heat and pressure, the larger tube 17 is sealed to the adjacent rear wall of the manifold 9.

When the upper plate 31 is again raised, the core 121 is removed. The manifold and tube assembly 8 shown in FIGS. 1-4 has now been formed.

Various changes and modifications may be made within the purview of this invention as will be readily apparent to those skilled in the art. Such changes and modifications are within the scope and teaching of this invention as defined by the claims appended hereto.

What is claimed is:

1. Apparatus for joining tubes to a manifold comprising a pair of plates that are movable toward and away from one another, said plates having complementary cavities in them that coact to define a chamber in which a manifold can be moulded from two plastic sheets, a core assembly that is disposed within said chamber during the moulding of said manifold and that coacts with the walls of said complementary cavities to define a relatively thin wall-defining space in which portions of said two plastic sheets can be confined to form the wall of said manifold and that includes a central slide member and a plurality of projecting pins that have the inner ends thereof abutting against one side of said central slide member and that have the outer ends thereof projecting outwardly and away from said one side of said central slide member, means interlocking with and surrounding said central slide member and holding said inner ends of said projecting pins in abutting relation with said one side of said central slide member, said outer ends of said projecting pins being sized to permit the inner ends of small diameter plastic tubes to be telescoped over said outer ends of said projecting pins and onto the shanks of said projecting pins, said interlocking means having an outer surface that is complementary to but is spaced inwardly from said walls of said complementary cavities in said plates for receiving in the resulting space therebetween the portions of said two plastic sheets that are to form said wall of said manifold, said plates having opposing recesses that communicate with and extend outwardly from said chamber and that surround but are spaced outwardly of said projecting pins, said recesses being dimensioned to accommodate said outer ends of said projecting pins plus said inner ends of said small diameter plastic tubes that are telescoped over said outer ends of said projecting pins and also to accommodate further portions of said two plastic sheets that are displaced laterally outwardly beyond the wall-forming portions of said two plastic sheets, and means to enable said plates and said core to apply heat to said two plastic sheets and to said inner ends of said small diameter plastic tubes, whereby when said plates are moved toward one another to enable said chamber which is defined by said complementary cavities to enclose said core assembly plus said wall-forming portions of said two plastic sheets and to enable said recesses to enclose said outer ends of said projecting pins plus said inner ends of said smaller diameter plastic tubes plus said further portions of said two plastic sheets and when said heat is applied by said plates and said core assembly, said small diameter plastic tubes are joined to said two plastic sheets and said two plastic sheets are joined together to form said manifold.

2. The apparatus of claim 1 wherein the circumferential length of said relatively thin wall-defining space, that is defined by said complementary cavities in said plates and by said core assembly, is shorter than the sum of the widths of said two plastic sheets whereby said further portions of said two plastic sheets are those side edges of said two plastic sheets which are adjacent said outer ends of said projecting pins, wherein the portions of said plates that are immediately adjacent one side of said chamber, which is defined by said complementary cavities, are shaped to press said side edges of said two plastic sheets toward each other, and wherein portions of said plates that are intermediate said recesses press into engagement with each other portions of said side edges of said two plastic sheets which are intermediate said outer ends of said projecting pins while said recesses in said plates press said further portions of said two plastic sheets against said small diameter plastic tubes.

3. The apparatus of claim 1 wherein said plates are movable far enough apart to permit said two plastic sheets to be essentially flat while one of said two plastic sheets is moved into position between one of said plates and said core assembly and while the other of said two plastic sheets is moved into position between the other of said plates and said core assembly, wherein the inner surface of said one plastic sheet is concave and the outer surface of said one plastic sheet is convex after said manifold is formed, wherein the inner surface of said other plastic sheet is concave and the outer surface of said other plastic sheet is convex after said manifold is formed, and wherein said recesses are circular in cross section and extend outwardly to the adjacent edges of said plates to accommodate appreciable portions of the lengths of said small diameter plastic tubes.

References Cited

UNITED STATES PATENTS

| | | | |
|---|---|---|---|
| 1,336,212 | 4/1920 | Evon | 249—186 |
| 1,575,498 | 3/1926 | Norton | 249—186 |
| 1,638,846 | 8/1927 | Guyot | 249—186 |
| 2,781,548 | 2/1957 | Morin | 249—186 |
| 2,818,618 | 1/1958 | Winship et al. | 249—186 |
| 2,975,480 | 3/1961 | Yanush | 249—142 X |
| 3,138,835 | 6/1964 | Van Patten | 249—142 X |
| 3,195,479 | 7/1965 | Beck et al. | 156—500 X |
| 3,283,375 | 11/1966 | Campbell et al. | 249—144 X |
| 3,363,876 | 1/1968 | Moore | 249—184 X |
| 3,567,174 | 3/1971 | Grace | 249—186 |

GEORGE F. LESMES, Primary Examiner

M. E. McCAMISH, Assistant Examiner

U.S. Cl. X.R.

156—196, 228, 292, 294, 443; 165—46; 249—176, 184; 264—313; 425—109, 357